US008375615B2

(12) United States Patent
Cameron

(10) Patent No.: US 8,375,615 B2

(45) Date of Patent: Feb. 19, 2013

(54) PLANAR SHEET MOUNTING DEVICE AND FRAME

(76) Inventor: Valerie Cameron, San Luis Obispo, CA (US)

( * ) Notice: Subject to any disclaimer, the term of this patent is extended or adjusted under 35 U.S.C. 154(b) by 246 days.

(21) Appl. No.: 12/955,836

(22) Filed: Nov. 29, 2010

(65) Prior Publication Data

US 2012/0134766 A1 May 31, 2012

(51) Int. Cl.
*G06F 1/12* (2006.01)

(52) U.S. Cl. ............ 40/781; 24/67.9; 24/546; 24/711.4; 40/737

(58) Field of Classification Search .................... 40/586, 40/734, 781, 799, 600, 622, 800, 124.4, 124.2; 24/67.3, 67.9, 546, 547, 711.4; 63/14.7, 63/20

See application file for complete search history.

(56) References Cited

U.S. PATENT DOCUMENTS

| | | | | | |
|---|---|---|---|---|---|
| 1,197,844 | A | * | 9/1916 | Muchmore | 24/1 |
| 1,577,949 | A | * | 3/1926 | Butler | 24/550 |
| 1,793,520 | A | * | 2/1931 | Siptrott | 24/346 |
| 1,918,115 | A | * | 7/1933 | Luft | 24/6 |
| 2,337,782 | A | * | 12/1943 | Sarge | 24/5 |
| 2,827,719 | A | * | 3/1958 | Nairn | 40/666 |
| 4,186,503 | A | * | 2/1980 | Fontana | 40/124.4 |
| 5,012,600 | A | * | 5/1991 | Wang | 40/737 |
| 5,507,459 | A | * | 4/1996 | Kiera | 248/218.2 |
| 5,655,272 | A | * | 8/1997 | Young | 24/482 |
| 5,845,889 | A | * | 12/1998 | Suzuki | 248/451 |
| 6,484,365 | B1 | * | 11/2002 | Thompson | 24/3.12 |
| 6,553,704 | B1 | * | 4/2003 | Pigg | 40/734 |
| 6,561,472 | B2 | * | 5/2003 | Mongaras | 248/218.2 |
| 6,688,029 | B1 | * | 2/2004 | Dunn | 40/711 |
| 7,216,404 | B1 | * | 5/2007 | Doyle | 24/573.11 |

* cited by examiner

*Primary Examiner* — Tashiana Adams
*Assistant Examiner* — Shin Kim
(74) *Attorney, Agent, or Firm* — Frank S. Michels

(57) ABSTRACT

A planar sheet mounting device comprising: a frame unit; at least one retaining unit connected to the frame unit, wherein the at least one retaining device comprises: a first plurality of formed segment pairs, wherein a formed segment pair comprises a first formed segment disposed on a second formed segment, wherein the second formed segment is substantially identical to the first formed segment, wherein the first formed segment is oriented in a plane substantially parallel to the plane of the second formed segment, whereby a planar sheet is retained when interposed between the first formed segment the second formed segment; a holder, wherein the first plurality of formed segment pairs are coupled to holder at least one point on each formed segment pair of the first plurality of formed segment pairs, and wherein the first plurality of formed segment pairs are oriented adjacent to each other; an affixant coupled to the holder for removably affixing the first plurality of formed segment pairs and the frame unit to a substrate.

20 Claims, 3 Drawing Sheets

PLANAR SHEET MOUNTING DEVICE AND FRAME

CROSS-REFERENCE TO RELATED APPLICATIONS

Not Applicable

FEDERALLY SPONSORED RESEARCH

Not Applicable

SEQUENCE LISTING OR PROGRAM LISTING

Not Applicable

FIELD OF THE INVENTION

The invention relates to a planar sheet mounting device. In particular, the invention relates to a planar sheet mounting device comprising: a frame unit and at least one retaining unit connected to the frame unit

BACKGROUND

Various methods and devices are known for attaching planar sheet items, such as papers, photographs, envelopes, etc. to a surface.

A first device includes a pin that pierces the item to attach it to a surface, such as a vertical wall. This method is simple and cost effective, but damages the item which is undesirable when the item is a picture or a piece of artwork or other keepsake item. Further, although decorative versions of these devices are available, they do little to enhance the quality and appearance of the display.

A second device includes a clip that uses spring force to retain the item and may include a clip or pin or other mechanism for attachment to a surface. This device is an improvement over the pin device, but still causes damage by creasing or deforming the item.

A third device includes a paper clip type retaining structure, which may also include a clip or pin or other mechanism for attaching to a surface. This device also causes damage by creasing or deforming the item. Further, although decorative variations of these devices are available and they do little to enhance the quality and appearance of the display.

Therefore it would be desirable to provide a planar sheet mounting device that overcomes these limitations of the prior art devices

SUMMARY OF THE INVENTION

One aspect of the present invention provides a planar sheet mounting device comprising: a frame unit; at least one retaining unit connected to the frame unit, wherein the at least one retaining device comprises: a first plurality of formed segment pairs, wherein a formed segment pair comprises a first formed segment disposed on a second formed segment, wherein the second formed segment is substantially identical to the first formed segment, wherein the first formed segment is oriented in a plane substantially parallel to the plane of the second formed segment, whereby a planar sheet is retained when interposed between the first formed segment the second formed segment; a holder, wherein the first plurality of formed segment pairs are coupled to holder at least one point on each formed segment pair of the first plurality of formed segment pairs, and wherein the first plurality of formed segment pairs are oriented adjacent to each other; an affixant coupled to the holder for removably affixing the first plurality of formed segment pairs and the frame unit to a substrate.

Another aspect of the invention provides a planar sheet retaining unit comprising: a first plurality of formed segment pairs; wherein a formed segment pair comprises a first formed segment disposed on a second formed segment; wherein the first formed segment is oriented in a plane substantially parallel to the plane of the second formed segment, whereby a planar sheet is retained when interposed between the first formed segment the second formed segment; a holder, wherein the first plurality of formed segment pairs are coupled to holder at least one point on each formed segment pair of the first plurality of formed segment pairs, and wherein the first plurality of formed segment pairs are oriented adjacent to each other; an affixant coupled to the holder for removably affixing the first plurality of formed segment pairs to a substrate.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention defined by the appended claims and equivalents thereof.

DETAILED DESCRIPTION

A device is provided for mounting a planar sheet, such as photographs, certificates, artwork, etc., which may be used in an office, a home, an automobile, or other personal space. Surfaces for mounting such items are typically vertically oriented and are comprised of fabric, drywall, wood, plastic, or other material suitable material.

Figure 1A:
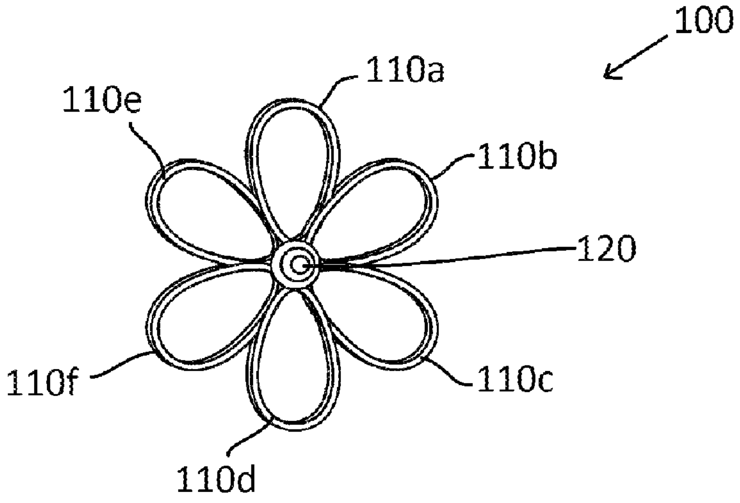
FIG. 1*a* is a front elevation view of a device comprising a frame unit according to the present invention.
Figure 1B:
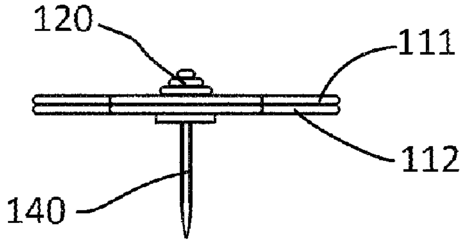
FIG. 1*b* is a side elevation view of a device comprising a frame unit according to the present invention.
Figure 1C:
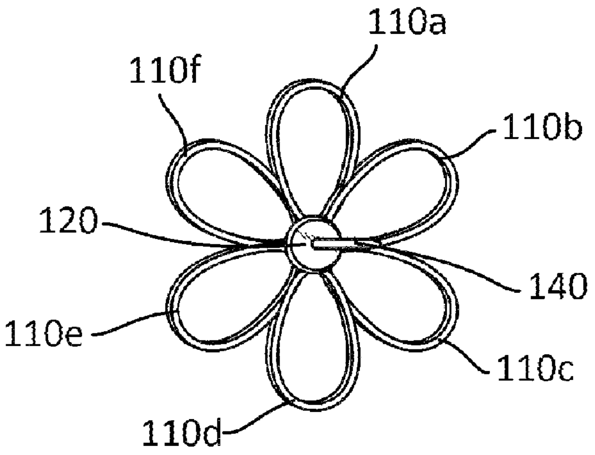
FIG. 1*c* is a back elevation view of a device comprising a frame unit according to the present invention.

FIGS. 1*a*-1*c* illustrate respective front, side, and back views of a first embodiment of a planar sheet mounting device 100. In general, planar sheet mounting device comprises a set of one or more formed segment pairs. FIG. 1*a* illustrates a front view of an exemplary embodiment of the planar sheet mounting device having a set of formed segment pairs, which includes six formed segment pairs 110*a*-110*f*, and a holder 120 that provides a structure to connect together each individual segment pair 110*a*-110*f*. The six formed segment pairs, 110*a*-110*f* are attached to the holder using, for example, an adhesive or a solder. In other embodiments, a pressure fit or threaded arrangement is used for attaching each formed segment pair to the holder 120. Holder 120 may extend from front of formed segment pairs 110*a*-110*f* to the back of formed segments 110*a*-110*f*, to grip the formed segment pairs abd aid in attachment of the formed segment pairs to the holder. As shown in exemplary side view illustrated in FIG. 1*b*, each formed segment pair 110*a*-110*f* includes a pair of formed segments, exemplified by first formed segment 111 and second formed segment 112. First and second formed segments 111, 112 are in direct contact with each other and are oriented in parallel planes. In a preferred embodiment, the first and second formed segments 111, 112 are the same size and shape, so that when seen from the front they appear as a single piece. In other embodiments, the first and second formed segments 111, 112 are of different sizes and/or shapes.

A planar sheet (not shown) is inserted between formed segments 111, 112 of one or more of the formed segment pairs 110*a*-110*f*, to retain the planar sheet, by way of the pressure or friction fit. In the preferred embodiment, where the formed segments are of the same size and shape the pressure or friction is provided by the intimate contact between the formed segments 111, 112, while not deforming the planar sheet 130 in any way. Formed segments 111, 112 are coated with a protective coating such as nylon, acrylic, or other plastic coating or by anodization. Coatings are also selected for their surface properties. Coatings, such as nylon, can enhance the ease of insertion of the planar sheet between the formed segments, while coatings, such as polyvinyl chloride (PVC) can enhance the retention of the planar sheet between the formed segments by increasing the friction coefficient of the surface. Coating protects planar sheet from damage and provides a means to modify the strength of the friction fit. In some embodiments coating can provide one or more colors or textures to the formed segment pairs. By way of example, coatings may include anodization, powder coating, nylon coating, or PVC. In other embodiments additional coatings are used or no coating is applied.

FIG. 1*c* illustrates a back view of an exemplary embodiment of the planar sheet mounting device 100. Affixant is shown as pin 140, which is shown coupled to holder 120 for removably affixing planar sheet mounting device 100 to a substrate (not shown). In other embodiments, pin 140 is replaced with other means for affixing the planar sheet mounting device 100 to a substrate, for example, a clip, a magnet, or a hook and loop strip, among others. The choice of affixant is based on the properties of the substrate and the preference of the user.

In one embodiment, formed segments 111, 112 are produced using a stiff but pliable linear material, such as a metallic wire, that provides an acceptable amount of stiffness and pliability to allow for production of various meaningful symbols. The formed segments define an outline wherein each formed segment pair produces a meaningful symbol by its outline. Meaningful symbols include various themes or groups of shapes, such as by way of example, garden items, ocean creatures, animals, stars, sports items, flowers, geometric shapes, astrological symbols, buildings, people, holidays, clothing, shoes, and tools. The selection of possible themes or groups of shapes is unlimited and any shape that can be rendered by shaping of the wire may be used. Metallic wire types suitable for the current invention include copper, aluminum, and stainless steel. In other embodiments, additional metal or plastic linear materials are used.

In the preferred embodiment, formed segment pairs 110*a*-110*f* are shown in the form of a rhodonea curve, or rose shape. A rhodonea curve is a sinusoid plotted in polar coordinates and can be expressed by the polar equation $r=\cos(k\theta)$. If k is an even integer, the curve is a rose shape having 2k petals and if k is an odd interger the curve is a rose shape having k petals. In other embodiments, other shapes are used and include any geometric shape and the meaningful symbols, as discussed above. The rhodonea curve is preferred for its ease of forming and decorative appearance.

Holder 120 is a solid or layered part that comprises a variety of shapes including a three dimensional geometric shapes. In one embodiment the three dimensional shape depicts a meaningful symbol. As above, meaningful symbols include various themes or groups of shapes, such as by way of example, garden items, ocean creatures, animals, stars, sports items, flowers, geometric shapes, astrological symbols, buildings, people, holidays, clothing, shoes, and tools. The selection of possible themes or groups of shapes is unlimited and any shape that can be rendered by forming or molding of the holder 120 may be used. In the preferred embodiment, holder 120 is formed of the same material as frame unit and formed segment pairs. In other embodiments different materials are used. Materials selected are based on ease of forming the selected meaningful symbol and include materials that provide one or more colors. In some embodiments, one or more coatings are provided that offer protection to holder 120, as discussed above with respect to the formed segments. Coatings may comprise one or more colors for providing a decorative finish to holder 120.

Figure 2A:
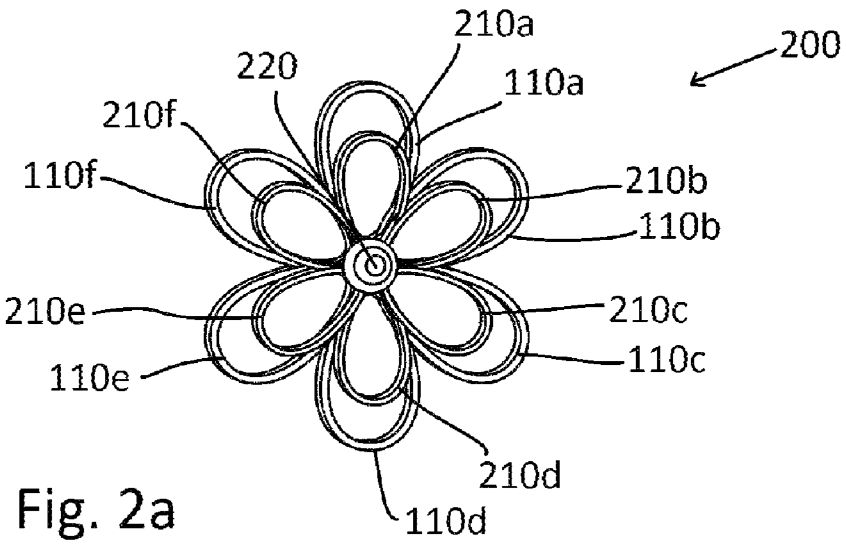
FIG. 2*a* is a front elevation view of a device comprising a frame unit according to the present invention.
Figure 2B:
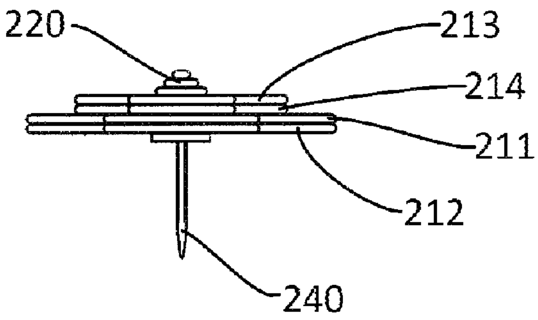
FIG. 2*b* is a side elevation view of a device comprising a frame unit according to the present invention.
Figure 2C:
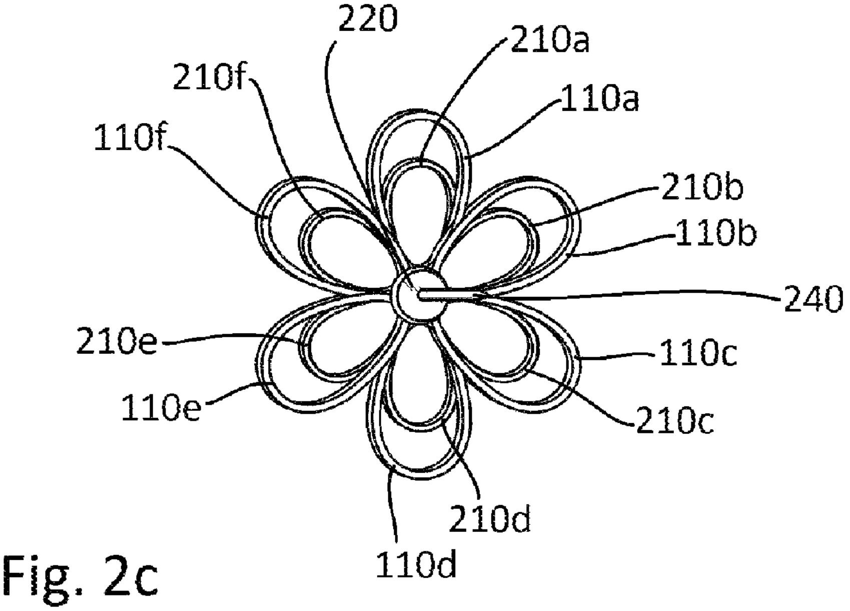
FIG. 2*c* is a back elevation view of a device comprising a frame unit according to the present invention.

FIG. 2*a*-2*c* illustrates respective front, side, and back views of a second embodiment of a planar sheet mounting device 200. The second embodiment includes a second set of formed segment pairs, which includes six formed segment pairs 210*a*-210*f*. Each formed segment pair in the second set of formed segment pairs 210*a*-210*f* includes respective third and fourth forth formed segments 213 and 214, similar to first and second formed segments 111 and 112 and shown in FIG. 2*b*. Second set of formed segment pairs is identical to first set of formed segment pairs 110*a*-110*f*, except smaller in size. In another embodiment, second set of formed segment pairs 210*a*-210*f* is a different shape than first set of formed segment pairs 110*a*-110*f*. Choice of size and shape is based on desired appearance. First set of formed segment pairs 110*a*-110*f* and second set of formed segment pairs 210*a*-210*f*, both accommodate insertion of a planar sheet. In another embodiment, either first set of formed segment pairs 110*a*-110*f* or second set of formed segment pairs 210*a*-210*f* is configured so as not to accommodate insertion of a planar sheet.

Second embodiment of the planar sheet mounting device includes a holder 220 for attachment of first and second sets of formed segment pairs 110*a*-110*f* and 210*a*-210*f*. Also, an affixant, such as pin 240 is included for affixing planar sheet mounting device 200 to substrate (not shown).

Figure 3:
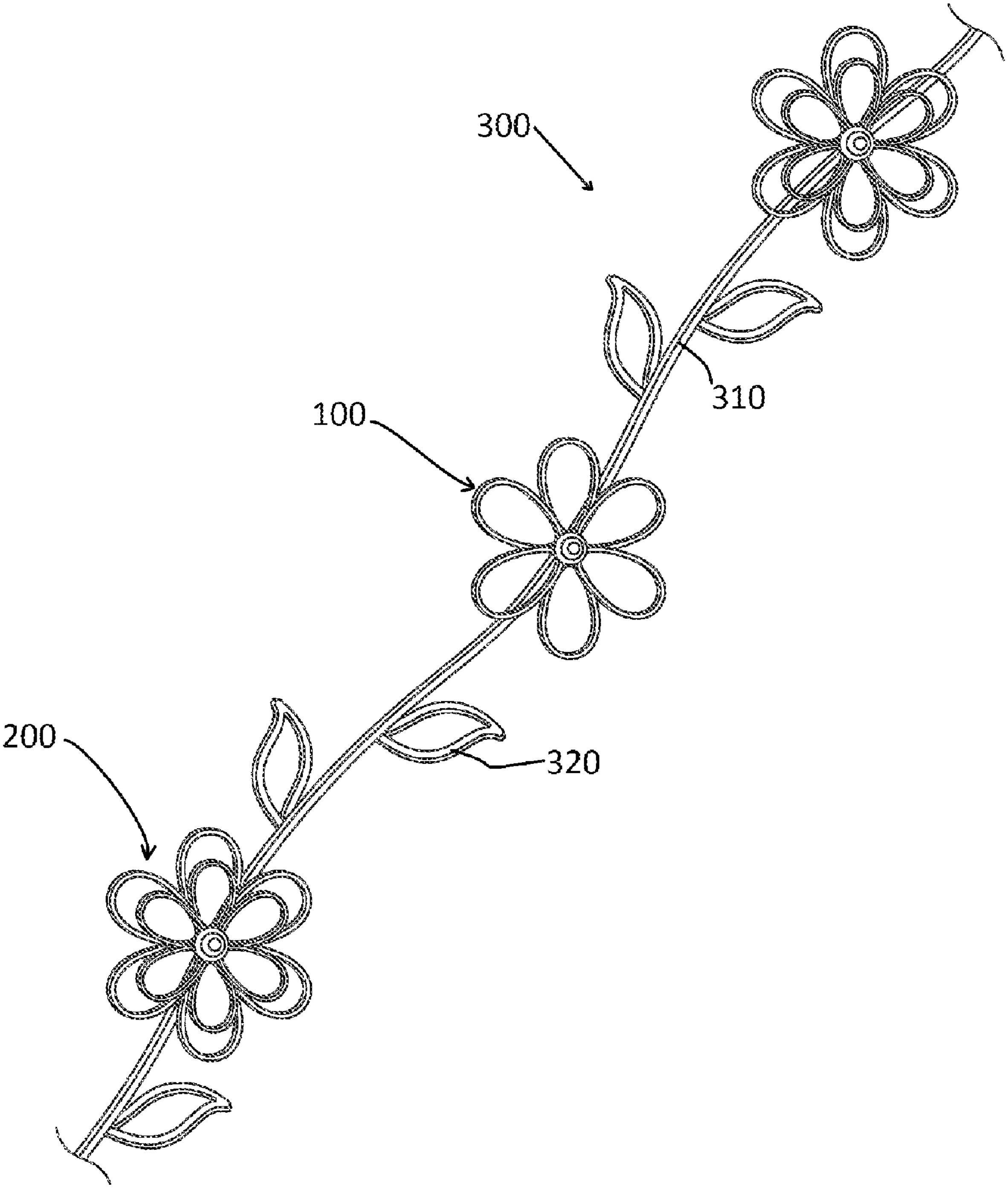
FIG. 3 is a perspective view of a device comprising a frame unit according to the present invention.

FIG. 3 illustrates one embodiment of a planar sheet mounting device. The planar sheet mounting device 300 includes a frame unit 310, shown having a curvilinear form. Other forms may be used, such as a linear form a rectilinear form and various geometric shapes. The shape of the frame unit is not limited and can be customized, for example, to match the place of use, to conform to the size and/or shape of the planar sheet, to conform to the size and/or shape of the mounting area, or to conform to the specifications of the user. Other variables can be incorporated into the frame unit design.

Connected to the frame unit is one or more planar sheet retaining units 100 and 200, as discussed above in relation to FIGS. 1 and 2. Planar sheet retaining units 100 and 200, are connected to the frame unit 310, using a solder, an adhesive, a pressure fit, or a threaded arrangement. In various embodiments, different combinations of planar sheet retaining units are used and different shaped planar sheet retaining units are used.

Planar sheet mounting device 300 includes a third formed segment 320 having a unique shape interspersed with planar sheet retaining units 100 and 200 and attached to frame unit 310. Third formed segment 320 is attached using any suitable means, such as adhesive or solder. In another, embodiment, third formed segment 320, is integrally formed with frame unit 310. In the preferred embodiment, third formed segment 320 is a single wire and does not function as a planar sheet retaining device. In other embodiments, both third formed segment 320 and frame unit 310, are constructed as a pair of segments, providing for the retention of a planar sheet.

In another embodiment, the frame unit 310 includes one or more apertures (not shown) corresponding to each planar sheet retaining unit 100, 200. Affixants, such as pins 140, 240, on each planar sheet retaining unit 100, 200, respectively, pass through respective apertures and contact or pierce substrate, providing for removal and interchange of different planar sheet retaining units 100, 200 using the same frame unit. Frame unit includes any number of apertures and not all apertures need be used. Spacing of apertures and planar sheet retaining units is typically from about 1-5 inches, but other values are used based on a number of variables, such as the size of the planar sheet, the stiffness of the planar sheet, the desired appearance, and the type of substrate, among others.

A planar sheet (not shown), as described above, is retained by one or more of the planar sheet retaining units, by way of the pressure or friction fit. In the preferred embodiment, frame unit 310 is formed of the same material as the holder and the formed segment pairs. In other embodiments different materials are used. Materials selected are based on ease of forming the selected shape or meaningful symbol and include materials that provide one or more colors. In other embodiments, one or more coatings, such as those discussed above, are provided that offer protection to frame unit 310. Coatings may comprise one or more colors for providing a decorative finish to frame unit 310.

In another embodiment, Holder 120 with coupled affixant 140 may be used with or without other parts, such as formed segment pairs or frame unit.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A planar sheet retaining unit comprising:

a first plurality of formed segment pairs;

wherein a formed segment pair comprises a first formed segment disposed on a second formed segment;

wherein the first formed segment is oriented in a plane substantially parallel to the plane of the second formed segment;

wherein the second formed segment is substantially identical to the first formed segment whereby a planar sheet is retained when interposed between the first formed segment the second formed segment;

a holder;

wherein the first plurality of formed segment pairs are coupled to holder at least one point on each formed segment pair of the first plurality of formed segment pairs, and wherein the first plurality of formed segment pairs are oriented adjacent to each other;

an affixant coupled to the holder for removably affixing the first plurality of formed segment pairs to a substrate.

2. The planar sheet planar sheet retaining unit of claim 1, wherein the first plurality of formed segment pairs comprises a substantially stiff but pliable linear material formed in a plurality of loop shaped segments.

3. The planar sheet planar sheet retaining unit of claim 1, wherein the plurality of loop shaped segments is in the form of a rhodonea curve.

4. The planar sheet retaining unit of claim 1, wherein the first plurality of formed segment pairs comprises a substantially stiff but pliable linear material defining an outline wherein each formed segment pair producing a meaningful symbol by its outline.

5. The planar sheet retaining unit of claim 4, wherein the meaningful symbols are selected from the group consisting of garden items, ocean creatures, animals, stars, sports items, flowers, geometric shapes, astrological symbols, buildings, people, holidays, clothing, shoes, and tools.

6. The planar sheet mounting device of claim 1, further comprising at least one second plurality of formed segment pairs having a substantially similar shape yet smaller dimensions than the first plurality of formed segments, wherein the second plurality of formed segment pairs is coupled to the first plurality of formed segment pairs at least one point on each formed segment pair of the second plurality of formed segment pairs.

7. The planar sheet retaining unit of claim 1, wherein the affixant comprises a piercing device, wherein the piercing device penetrates the substrate to removably affix the planar sheet retaining device the substrate.

8. A planar sheet mounting device comprising:

a frame unit;

at least one retaining unit connected to the frame unit, wherein the at least one retaining device comprises:

a first plurality of formed segment pairs;

wherein a formed segment pair comprises a first formed segment disposed on a second formed segment, wherein the second formed segment is substantially identical to the first formed segment;

wherein the first formed segment is oriented in a plane substantially parallel to the plane of the second formed segment, whereby a planar sheet is retained when interposed between the first formed segment the second formed segment;

a holder;

wherein the first plurality of formed segment pairs are coupled to holder at least one point on each formed segment pair of the first plurality of formed segment pairs; and wherein the first plurality of formed segment pairs are oriented adjacent to each other;

an affixant coupled to the holder for removably affixing the first plurality of formed segment pairs and the frame unit to a substrate.

9. The planar sheet mounting device of claim 8, wherein the at least one retaining unit is removably connected to the frame unit.

10. The planar sheet mounting device of claim 8, wherein the frame unit includes at least one aperture formed thereon, wherein the affixant passes through the frame unit at the at least one aperture.

11. The planar sheet mounting device of claim 8, further comprising a second plurality of formed segment pairs having a substantially similar shape yet smaller dimensions than the first plurality of formed segments, wherein the second plurality of formed segment pairs is coupled to the first plurality of formed segment pairs at least one point on each formed segment pair of the second plurality of formed segment pairs.

12. The planar sheet mounting device of claim 8, wherein the frame unit comprises a form selected from the group consisting of a geometric form, a curvilinear form, and a linear form.

13. The planar sheet mounting device of claim 8, wherein the first plurality of formed segment pairs comprises a substantially stiff but pliable linear material formed in a plurality of loop shaped segments.

14. The planar sheet retaining unit of claim 13, further comprising a coating disposed on the stiff but pliable linear material.

15. The planar sheet mounting device of claim 8, wherein the first plurality of formed segment pairs comprises a substantially stiff but pliable linear material defining an outline wherein each formed segment pair producing a meaningful symbol by its outline.

16. The planar sheet mounting device of claim 8, wherein the affixant is coupled to the frame unit.

17. The planar sheet mounting device of claim 8, wherein the holder further comprises a three dimensional shape wherein the holder producing a meaningful symbol by its shape.

18. The planar sheet mounting device of claim 8, further comprising a plurality of retaining units, wherein the retaining units are oriented sequentially separated from each other.

19. The planar sheet mounting device of claim 16, further comprising an third formed segment, wherein the third formed segment comprises a shape different from the first formed segment and the second formed segment, wherein the third formed segment is interspersed among the plurality of retaining units.

20. A planar sheet mounting device comprising:

a frame unit;

at least one retaining unit removably connected to the frame unit, wherein the at least one retaining device comprises:

a first plurality of formed segment pairs;

wherein a formed segment pair comprises a first formed segment disposed on a second formed segment, wherein the second formed segment is substantially identical to the first formed segment;

wherein the first formed segment is oriented in a plane substantially parallel to the plane of the second formed segment, whereby a planar sheet is retained when interposed between the first formed segment the second formed segment;

a holder;

wherein the first plurality of formed segment pairs are coupled to holder at least one point on each formed segment pair of the first plurality of formed segment pairs; and wherein the first plurality of formed segment pairs are oriented adjacent to each other;

an affixant coupled to the frame unit for removably affixing the first plurality of formed segment pairs and the frame unit to a substrate.

* * * * *